US009588643B2

United States Patent
Miller

(10) Patent No.: US 9,588,643 B2
(45) Date of Patent: Mar. 7, 2017

(54) ELECTRONIC DEVICES WITH HAND DETECTION CIRCUITRY

(71) Applicant: Apple Inc., Cupertino, CA (US)

(72) Inventor: Thayne M. Miller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 14/575,051

(22) Filed: Dec. 18, 2014

(65) Prior Publication Data
US 2016/0179338 A1   Jun. 23, 2016

(51) Int. Cl.
| | | |
|---|---|---|
| G06F 3/0481 | (2013.01) | |
| G06F 3/044 | (2006.01) | |
| G06F 1/16 | (2006.01) | |
| G06K 9/00 | (2006.01) | |
| G06F 3/0484 | (2013.01) | |

(52) U.S. Cl.
CPC ........ G06F 3/04817 (2013.01); G06F 1/1694 (2013.01); G06F 3/044 (2013.01); G06F 3/04842 (2013.01); G06K 9/00013 (2013.01); G06K 9/00375 (2013.01); *G06F 2203/04101* (2013.01)

(58) Field of Classification Search
CPC .... G06F 3/048; G06F 3/04817; G06F 3/0488; G06F 1/1694; G06K 9/00375
See application file for complete search history.

(56) References Cited

U.S. PATENT DOCUMENTS

| | | | |
|---|---|---|---|
| 6,947,580 B1* | 9/2005 | Kinsella | G06F 3/03543 345/167 |
| 9,292,191 B2* | 3/2016 | Kim | G06F 3/042 |
| 2011/0087963 A1 | 4/2011 | Brisebois et al. | |
| 2013/0019192 A1 | 1/2013 | Itoh et al. | |
| 2013/0111384 A1* | 5/2013 | Kim | G06F 3/048 715/765 |
| 2013/0143653 A1* | 6/2013 | Yamaoka | A63F 13/06 463/31 |
| 2013/0145316 A1* | 6/2013 | Heo | G06F 3/04817 715/810 |
| 2013/0212535 A1* | 8/2013 | Kim | G06F 3/0482 715/841 |
| 2013/0271360 A1* | 10/2013 | MacDougall | H04M 1/72519 345/156 |
| 2014/0082514 A1 | 3/2014 | Sivaraman et al. | |

(Continued)

*Primary Examiner* — Ricardo L Osorio
(74) *Attorney, Agent, or Firm* — Treyz Law Group, P.C.; Kendall W. Abbasi

(57) ABSTRACT

An electronic device may include a touch-sensitive display and sensor circuitry that detects whether a user's right hand or left hand is being used to operate the touch-sensitive display. Control circuitry may arrange icons and virtual buttons on the touch-sensitive display based on which hand is being used to provide touch input to the touch-sensitive display. For example, when the sensor circuitry detects a user operating the electronic device with his or her left hand, the control circuitry may position icons and virtual buttons closer to the left edge of the touch-sensitive display so that the icons and virtual buttons are easier to reach with the user's left hand. The sensor circuitry may include one or more touch sensors, proximity sensors, fingerprint sensors, motion sensors, or other suitable sensors capable of gathering information about which hand is being used to operate the electronic device.

17 Claims, 10 Drawing Sheets

(56) References Cited

U.S. PATENT DOCUMENTS

| | | |
|---|---|---|
| 2014/0145960 A1 | 5/2014 | Takeda |
| 2014/0298266 A1 | 10/2014 | Lapp |
| 2015/0087275 A1* | 3/2015 | Brisebois ................ H04W 8/22 455/414.1 |
| 2015/0089359 A1* | 3/2015 | Brisebois ............ G06F 3/04817 715/702 |
| 2015/0089360 A1* | 3/2015 | Brisebois ............ G06F 3/04817 715/702 |
| 2015/0089386 A1* | 3/2015 | Brisebois .............. G06F 3/0488 715/746 |
| 2015/0089411 A1* | 3/2015 | Ban ....................... G06F 3/0486 715/765 |
| 2015/0135108 A1* | 5/2015 | Pope .................. G06K 9/00006 715/767 |
| 2015/0220218 A1* | 8/2015 | Jeon .................... G06F 3/04886 715/825 |

\* cited by examiner

ELECTRONIC DEVICES WITH HAND DETECTION CIRCUITRY

BACKGROUND

This relates generally to electronic devices and, more particularly, to electronic devices with hand detection circuitry.

Electronic devices often include touch screen displays. In a typical configuration, a touch screen display serves as the primary user input mechanism for an electronic device. For example, a portable electronic device may include a small number of physical buttons for performing a specific set of input functions and a touch screen display for performing a much larger and more dynamic set of input functions. The touch screen display typically displays user interface elements such as icons and virtual buttons that, when touched by a user, perform a desired action.

Portable electronic devices such as handheld computing devices are often held in and operated with one hand. For example, a user often holds an electronic device in the palm of his or her hand while using the thumb of that hand to interact with the touch screen display. Even when an electronic device is held in two hands, a user will tend to use one hand to provide touch input to the touch screen display.

For some users, it can be difficult to reach the entirety of a touch screen display with one hand. For example, a left handed user may easily be able to reach icons along the left edge of the display but may find it difficult to reach icons along the right edge of the display.

Some electronic devices have made one-handed use easier by allowing for a one-handed mode in which icons near the upper edge of a display are lowered to be closer to the lower edge of the display. This type of adjustment makes it easier for a user to reach the icons with his or her thumbs. However, because conventional electronic devices do not take into account which hand is being used, some icons may still be difficult to reach with one hand even when lowered to the bottom portion of the display.

It would therefore be desirable to be able to provide improved electronic devices for one-handed use.

SUMMARY

An electronic device may include a touch-sensitive display and sensor circuitry that detects whether a user's right hand or left hand is being used to operate the touch-sensitive display. Control circuitry in the electronic device may arrange icons and virtual buttons on the touch-sensitive display based on which hand is being used to provide touch input to the touch-sensitive display.

For example, when the sensor circuitry detects a user operating the electronic device with his or her left hand, the control circuitry may position icons and virtual buttons closer to the left edge of the touch-sensitive display so that the icons and virtual buttons are easier to reach with the user's left hand. Similarly, when the sensor circuitry detects a user operating the electronic device with his or her right hand, the control circuitry may position icons and virtual buttons closer to the right side of the display.

The sensor circuitry may include one or more touch sensors, proximity sensors, fingerprint sensors, motion sensors, or other suitable sensors capable of gathering information on which hand is being used to operate the electronic device.

A motion sensor may detect a rotation of the electronic device as a user moves the electronic device from one position (e.g., the user's pocket) to a another position (e.g., near the user's ear). The rotation may be indicative of which hand is being used to hold and operate the electronic device.

Sensors along opposite sides of the electronic device may be used to gather information about how the device itself is being held, which in turn can be used to determine whether the electronic device is in a user's left or right hand. The sensors may include a first touch or proximity sensor on a first side of the electronic device and a second touch or proximity sensor on a second side of the electronic device.

A touch sensor may be used to detect a pattern of touch input which can in turn be indicative of the arc path followed by a user's thumb during one-handed operation. The arc path information may in turn be used to determine which hand is being used to provide touch input to the electronic device.

A fingerprint sensor may be used to detect the orientation of a user's finger, which can in turn be used to determine whether the fingerprint is associated with a user's left or right hand. For example, the angle at which a fingerprint (e.g., a thumbprint) is oriented and/or the orientation of ridges in a fingerprint may be used to determine which hand is being used to operate the electronic device.

Further features of the invention, its nature and various advantages will be more apparent from the accompanying drawings and the following detailed description of the preferred embodiments.

DETAILED DESCRIPTION

Figure 1:
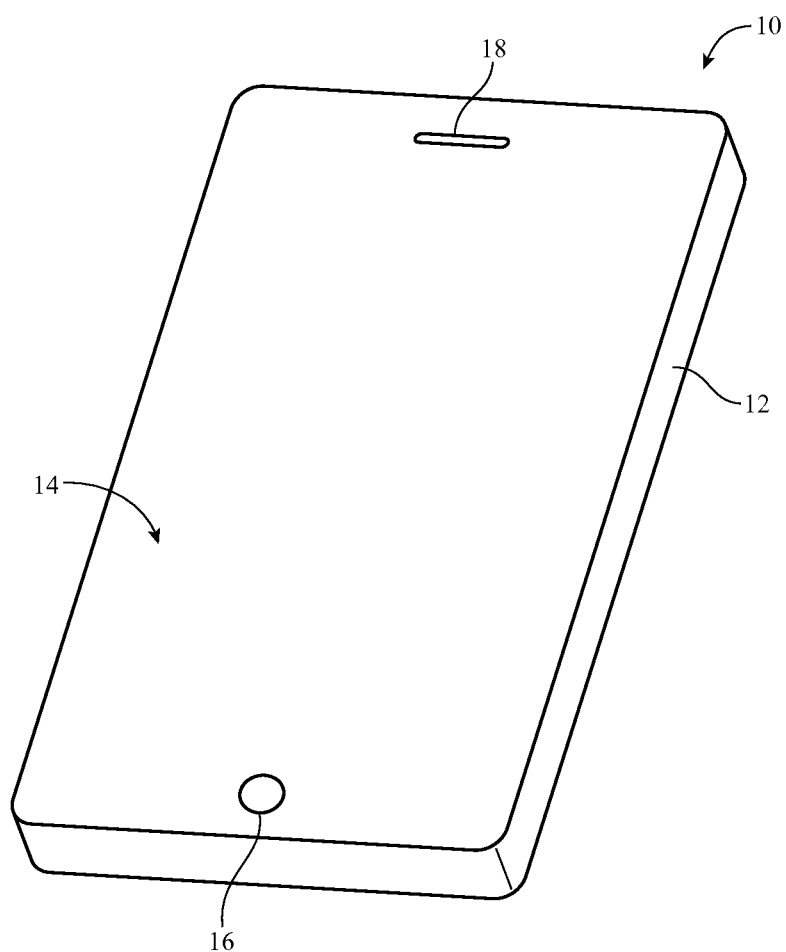
FIG. 1 is a perspective view of an illustrative electronic device of the type that may be provided with hand detection circuitry in accordance with an embodiment of the present invention.

An illustrative electronic device that may be provided with hand detection circuitry is shown in FIG. 1. Electronic device 10 of FIG. 1 may be a handheld electronic device or other electronic device. For example, electronic device 10 may be a cellular telephone, media player, or other handheld portable device, a somewhat smaller portable device such as a wrist-watch device, pendant device, or other wearable or miniature device, gaming equipment, a tablet computer, a notebook computer, a desktop computer, a television, a computer monitor, a computer integrated into a computer display, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. A rectangular ring-shaped region surrounding the periphery of the active display region may not contain any active display pixels and may therefore sometimes be referred to as the inactive area of the display. The display cover layer or other display layers in display 14 may be provided with an opaque masking layer in the inactive region to hide internal components from view by a user.

Figure 2:
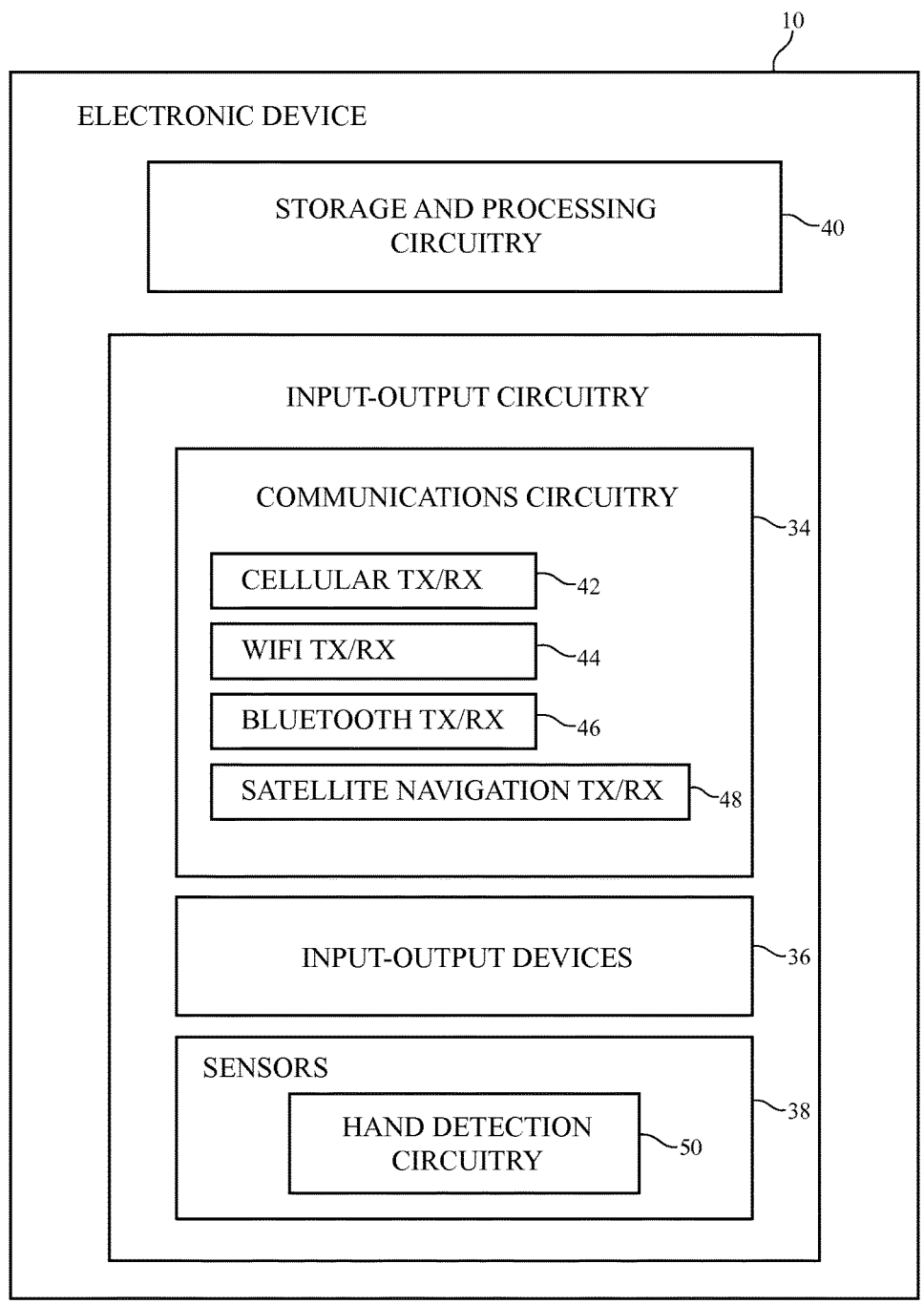
FIG. 2 is a schematic diagram of an illustrative electronic device having hand detection circuitry in accordance with an embodiment of the present invention.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on one or more microprocessors, microcontrollers, digital signal processors, baseband processor integrated circuits, application specific integrated circuits, etc.

With one suitable arrangement, storage and processing circuitry 40 may be used to run software on device 10 such as internet browsing applications, email applications, media playback applications, activity logging applications, fitness applications, operating system functions, software for capturing and processing images, software implementing functions associated with gathering and processing sensor data, software that makes adjustments to display brightness and touch sensor functionality, etc.

To support interactions with external equipment, storage and processing circuitry 40 may be used in implementing communications protocols. Communications protocols that may be implemented using storage and processing circuitry 40 include internet protocols, wireless local area network protocols (e.g., IEEE 802.11 protocols—sometimes referred to as WiFi®), protocols for other short-range wireless communications links such as the Bluetooth® protocol, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). As shown in FIG. 2, circuitry 34 may include one or more radio-frequency transceivers such as cellular telephone transceiver circuitry 42 (e.g., one or more cellular telephone transmitters and/or receivers), IEEE 802.11 (WiFi®) transceiver circuitry 44 (e.g., one or more wireless local area network transmitters and/or receivers), Bluetooth® transceiver circuitry 46 such as a Bluetooth® Low Energy (Bluetooth LE) transmitter and/or receiver, and satellite navigation system receiver circuitry 48 (e.g., a Global Positioning System receiver or other satellite navigation system receiver).

Input-output circuitry 32 may include input-output devices 36 such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures. Sensors 38 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology). If desired, other components in device 10 may be formed using microelectromechanical systems technology.

Sensors 38 may include hand detection circuitry 50 (sometimes referred to as dominant hand sensor circuitry). Hand detection circuitry 50 may include one or more sensors for detecting a user's hands and for determining which hand is being used to operate electronic device 10. Sensors that may be used in hand detection circuitry 50 include accelerometers (e.g., accelerometers that measure acceleration along one, two, three, four, five, or six axes), gyroscopes, compasses, air pressure sensors, other suitable types of motion sensors, force sensors, switches or other mechanical sensors, capacitive sensors, resistance-based sensors, light-based sensors, and/or acoustic-based sensors such as ultrasonic acoustic-based sensors (as examples).

Hand detection circuitry 50 may be formed from designated hand detection sensors that are used exclusively for determining whether a right or left hand is operating electronic device 10 or may be formed from electronic components that perform other functions (e.g., functions other than detecting which hand is being used to operate electronic device 10). For example, hand detection circuitry 50 may gather information from a touch sensor in electronic device 10 (e.g., a touch sensor that forms part of touch screen display 14), a fingerprint sensor in electronic device 10, a motion sensor in electronic device 10, an antenna in electronic device 10, or other suitable electronic component in electronic device 10 to determine which hand is being used to operate electronic device 10.

Hand detection circuitry 50 may use control circuitry such as storage and processing circuitry 40 to store and process sensor data gathered using hand detection circuitry 50 and to take suitable actions based on which hand is being used to operate electronic device 10. Control circuitry 40 may dynamically adjust the operating system to accommodate one-handed operation and, in particular, to customize the user interface such that a user can operate the electronic device more easily with one hand.

Figure 3:
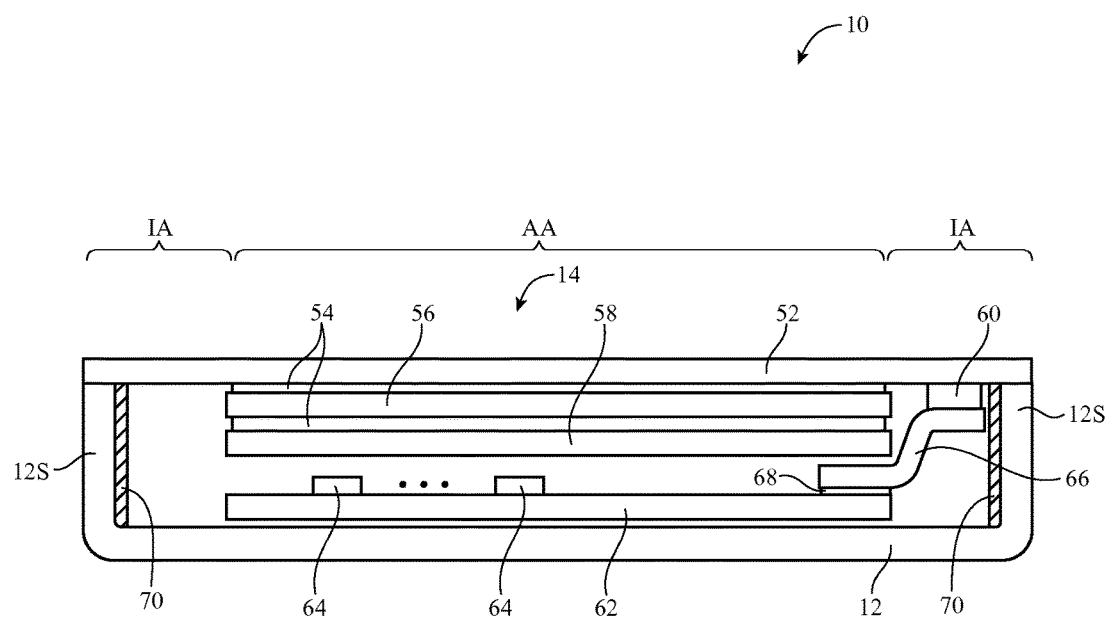
FIG. 3 is a cross-sectional side view of an electronic device showing illustrative sensors that may be used in detecting which hand is being used to operate the electronic device in accordance with an embodiment of the present invention.

A cross-sectional side view of electronic device 10 is shown in FIG. 3. As shown in FIG. 3, display 14 may be mounted in housing 12. Display structures 58 such as a liquid crystal display module, an organic light-emitting diode display layer, or other display structures that include an array of active display pixels may be formed under display cover layer 52 in active area AA of display 14. Display structures 58 may include polarizer layers, color filter layers, thin-film transistor layers, adhesive layers, layers of liquid crystal material, or other structures for producing images on display 14. Display cover layer 52 may be formed from a clear glass layer, a layer of transparent plastic, or other cover layer material. An opaque masking layer such as a layer of ink (e.g., black ink or white ink or ink of other colors) may be formed on the underside of display cover layer 52 in inactive area IA and may be used to hide internal components from view by a user.

As shown in FIG. 3, display 14 may include one or more layers of touch-sensitive components such as touch sensor 56 attached to cover layer 52. Touch sensor 56 may be attached to cover layer 52 using an adhesive material such as optically clear adhesive (OCA) 54. Adhesive 54 may be a liquid adhesive, light-cured adhesive, pressure-sensitive adhesive or other suitable adhesive. Touch sensor 56 may include touch sensor components such as an array of capacitive touch sensor electrodes formed from transparent conductive materials such as indium tin oxide. Display structures 58 may be attached to touch sensor 56 using an additional layer of optically clear adhesive 54.

Electronic device 10 may include biometric sensors such as fingerprint sensor 60. Fingerprint sensor 60 may be configured to read a user's fingerprint when the user places his or her finger over sensor 60. Sensor 60 may include a sensor surface formed from anisotropic dielectric material such as sapphire. The sensor surface captures a detailed image of the user's fingerprint, and processing circuitry (e.g., processing circuitry 40 of FIG. 2) reads the ridges of the fingerprint (e.g., to match the fingerprint with a previously stored fingerprint).

Communications paths such as metal lines on dielectric substrates may be used in interconnecting sensor structures 60 with processing circuitry in device 10. As an example, sensors 60 may be mounted on a substrate such as substrate 66. Substrate 66 may be coupled to additional substrates in device 10 such as illustrative substrate 62 using connectors such as connector 68 (e.g., a board-to-board connector or other connection structures).

Device 10 may have electrical components such as components 64. Components 64 may include integrated circuits, buttons, connectors, sensors, and other circuitry of the type shown in FIG. 2. Components 64 may be mounted on one or more substrates such as substrate 62 and/or substrate 66. Substrates 62 and 66 may be dielectric carriers such as molded plastic carriers or may be printed circuits. For example, substrates 62 and 66 may be printed circuits such as rigid printed circuit boards formed from a material such as fiberglass-filled epoxy or flexible printed circuits formed from sheets of polyimide or other flexible polymer layers.

In some embodiments, hand detection circuitry 50 may use fingerprint information from fingerprint sensor 60 to determine which hand is the user's dominant hand and/or to determine which hand is currently being used to operate electronic device 10. Fingerprint information may, for example, be used to determine the angle at which a user places his or her finger on fingerprint sensor 60, which in turn can be indicative of whether the left or right hand is being used. The orientation of ridges in a fingerprint can also be indicative of a user's handedness. If desired, fingerprint information can be gathered by hand detection circuitry during normal fingerprint detection operations (e.g., during authentication operations when a user unlocks electronic device 10).

In some embodiments, hand detection circuitry 50 may use touch sensor 56 to determine which hand is the user's dominant hand and/or to determine which hand is currently being used to operate electronic device 10. For example, touch sensor 56 may be used to gather information about the arc path followed by a user's thumb during normal touch input operations. The arc path information may be indicative of which hand is being used to operate electronic device 10.

If desired, hand detection circuitry 50 may gather information using other sensors in electronic device 10 such as side sensors 70. Side sensors 70 may be located on one or more sidewalls 12S of electronic device 10 and may be used to detect the proximity and/or contact of a user's hands on the edges of electronic device 10. Side sensors 70 may be located on one, two, three, or all four sides of electronic device 10. Side sensors 70 may, for example, be located on a left hand side of electronic device 10 and an opposing right hand side of electronic device 10. By determining where the sides of electronic device 10 are being contacted by a user's hands and/or by determining how much of one side is covered by a user's hands relative to the opposing side, hand detection circuitry 50 can determine whether electronic device 10 is being operated with a user's left hand or right hand.

Side sensors 70 may be formed from force sensors, from switches or other mechanical sensors, from capacitive sensors, from resistance-based sensors, from light-based sensors, and/or from acoustic-based sensors such as ultrasonic acoustic-based sensors (as examples). In one illustrative arrangement, sensors 70 may be formed from touch sensor elements. The touch sensor elements that form touch sensors 70 may be based on any suitable touch sensor technology such as capacitive touch technology, acoustic touch technology, force-sensor-based touch technology, or resistive touch technology (as examples).

In capacitive touch sensors, capacitive electrodes may be formed from a conductive material. For example, the touch sensor electrodes may be formed from a transparent conductive material such as indium tin oxide. Configurations in which sensors 70 are capacitive touch sensors and in which touch sensor electrodes for touch sensors 70 are formed from transparent conductive materials are sometimes described herein as an example. Other types of arrangements may be used for sensors 70 if desired (e.g., arrangements with non-capacitive sensors, arrangements with capacitive electrodes formed from materials other than indium tin oxide, touch sensor electrodes formed from non-transparent metal, etc.).

In some embodiments, hand detection circuitry 50 may gather information from one or more motion sensors in electronic device 10 to determine which hand is being used to operate electronic device 10. A user in possession of electronic device 10 may move electronic device 10 through a series of predictable motions during use and during non-use, and these motions can be indicative of the user's handedness.

Figure 4A:
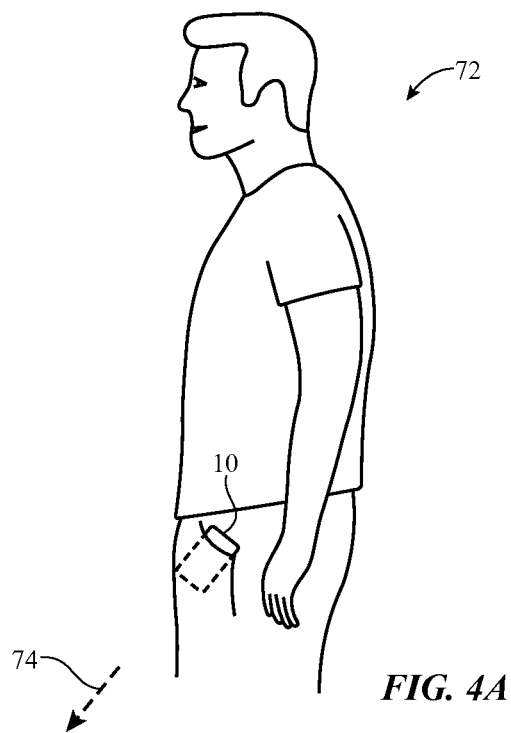
FIG. 4A is a diagram illustrating how the orientation of an electronic device when the electronic device is not in use can be indicative of which hand is typically used to operate the electronic device in accordance with an embodiment of the present invention.
Figure 4B:
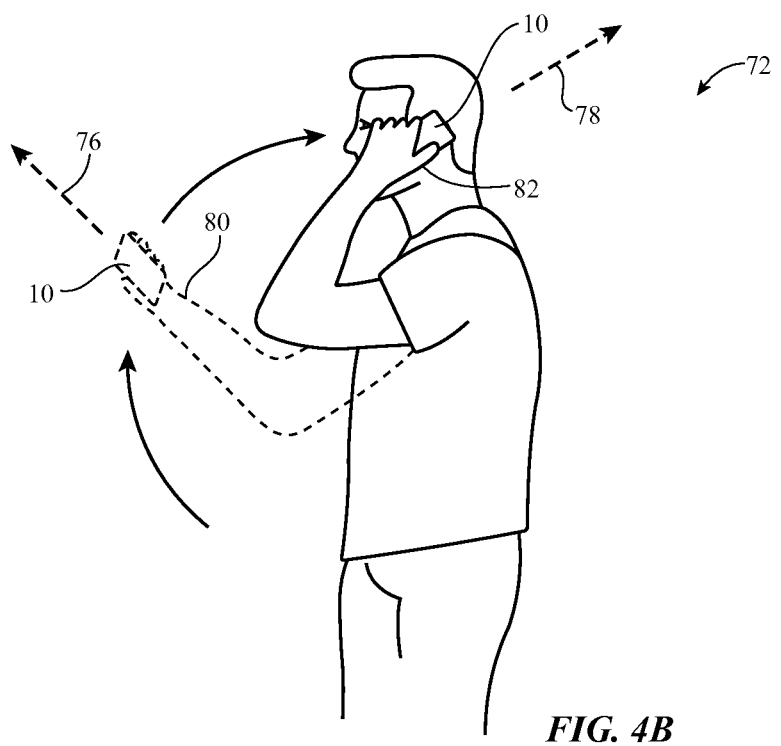
FIG. 4B is a diagram illustrating how the electronic device of FIG. 4A may rotate in a predictable manner when moved from the user's pocket to a position near the user's ear in accordance with an embodiment of the present invention.

Diagrams illustrating how a user's motion of electronic device 10 can be indicative of which hand is being used to operate electronic device 10 are shown in FIGS. 4A and 4B. FIG. 4A shows how electronic device 10 may be oriented when the device is not in use (e.g., when device 10 is in a user's pocket). FIG. 4B shows how electronic device 10 may be oriented when the device is in use (e.g., when a user is operating touch screen display 14 of electronic device 10 and/or when electronic device 10 is in a position near the user's ear during a telephone call). Motion sensor circuitry in electronic device 10 (e.g., motion sensors in sensors 38 of FIG. 2) may track the change in orientation of electronic device 10 as the device moves from a not-in-use position to an in-use position. The change of orientation may be indicative of the handedness of the user.

In FIG. 4A, for example, user 72 has electronic device 10 in his pocket. In a typical scenario, the front face of electronic device 10 (e.g., the display side of electronic device 10) faces the user's body while in the user's pocket. The top of electronic device 10 points in from of the user in direction 74.

In FIG. 4B, user 72 has removed electronic device 10 from his pocket and holds the device in one of two positions. In position 80, user 72 holds electronic device 10 in front of his face while user 72 views the display of electronic device 10. In this position, the front of electronic device 10 faces the user and the top of electronic device 10 points in direction 76. In position 82, user 72 holds electronic device 10 next to his ear while user 72 listens to audio from a speaker in electronic device 10 and/or while user 72 talks to a microphone in electronic device 10 (e.g., during a telephone call). In this position, the front of electronic device 10 faces the user and the top of electronic device 10 points behind the user in direction 78.

The rotation and change of orientation of electronic device 10 as it moves from the pocket position of FIG. 4A to the in-use position 80 or 82 of FIG. 4B may be indicative of what hand the user prefers to use to operate electronic device 10. For example, the rotation of electronic device 10 for the left-handed user of FIGS. 4A and 4B may be in a counter-clockwise direction, whereas the rotation of an electronic device for a right-handed user performing a similar movement may be in a clockwise direction (as an example). A motion sensor (e.g., a gyroscope and/or an accelerometer that measures acceleration along one, two, three, four, five, or six axes of motion) may detect the change of orientation and rotation of electronic device 10 as it moves from one location to another, which may in turn be used by hand detection circuitry 50 to determine whether a left or right hand is being used to operate electronic device 10.

If desired, electronic device 10 may store information about types of gestures so that the device can recognize when one hand is being used versus the other hand. The information may be based on previously gathered data (e.g., data gathered and stored during manufacturing) and/or may be based on data gathered during operation of electronic device 10.

If desired, orientation information may be gathered during certain activities to determine which hand is being used by the user. For example, an accelerometer may be used to determine the orientation of electronic device 10 during a telephone call, which in turn can be used to determine whether electronic device 10 is being held against the user's right ear or left ear. If the accelerometer detects that the user holds electronic device 10 up to his or her right ear, hand detection circuitry 50 may determine that the user is currently using his or her right hand to operate electronic device 10. If the accelerometer repeatedly detects that the user holds electronic device 10 up to his or her right ear, hand detection circuitry 50 may determine that the user is right-handed.

Figure 5A:
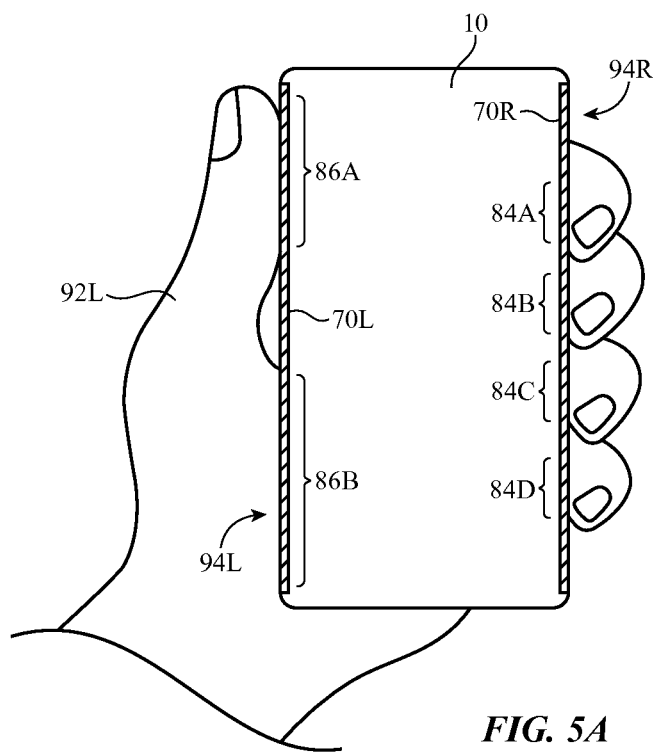
FIG. 5A is a diagram illustrating how sensors along the sides of an electronic device can detect when a user is holding the electronic device with his or her left hand in accordance with an embodiment of the present invention.
Figure 5B:
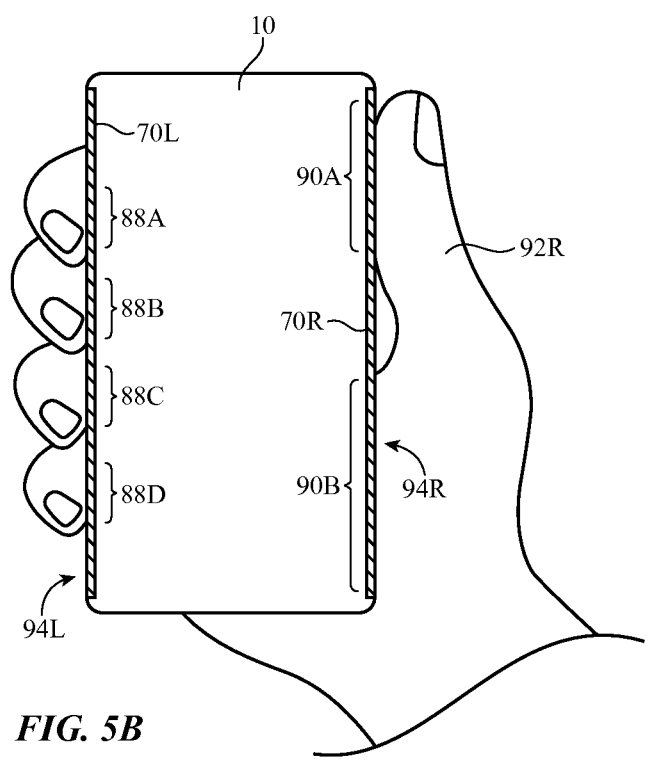
FIG. 5B is a diagram illustrating how sensors along the sides of an electronic device can detect when a user is operating the electronic device with his or her right hand in accordance with an embodiment of the present invention.

FIGS. 5A and 5B illustrate how sensors along the sides of electronic device 10 can be used to determine whether a right or left hand is being used to hold and/or operate electronic device 10. Electronic device 10 may, for example, include left side sensors 70L along left side 94L and right side sensors 70R along right side 94R. Sensors 70 may be proximity sensors and/or touch sensors that are configured to detect the proximity or contact of external objects such as a user's fingers along the sides of electronic device 10.

In the example of FIG. 5A, a user's left hand 92L is being used to operate electronic device 10. With this type of grip, the user's left thumb and palm may be in contact with left side 94L of electronic device 10 in regions 86A and 86B, respectively. The other fingers may be in contact with right side 94R of electronic device 10 in regions 84A, 84B, 84C, and 84D. Side sensors 70 may detect the regions of contact on left side 94L and right side 94R, which may in turn be used by hand detection circuitry 50 to determine whether a right or left hand is being used to operate electronic device 10. Hand detection circuitry 50 may use sensors 70 to determine which side is more covered and/or to determine which side has the greater number of contact points. For example, as shown in FIG. 5A, left side 94L may have a greater portion covered by hand 92L than right side 94R, but may have a fewer number of contact areas than right side 94R (e.g., may have two regions of contact instead of four). Based on this information, hand detection circuitry 50 may determine that a left hand is being used to hold and operate electronic device 10.

In the example of FIG. 5B, a user's right hand 92R is being used to operate electronic device 10. With this type of grip, the user's right thumb and palm may be in contact with right side 94R of electronic device 10 in regions 90A and 90B, respectively. The other fingers may be in contact with left side 94L of electronic device 10 in regions 88A, 88B, 88C, and 88D. Side sensors 70 may detect the regions of contact on left side 94L and right side 94R, which may in turn be used by hand detection circuitry 50 to determine whether a right or left hand is being used to operate electronic device 10. Hand detection circuitry 50 may use sensors 70 to determine which side is more covered and/or to determine which side has the greater number of contact points. For example, as shown in FIG. 5B, right side 94R may have a greater portion covered by hand 92R than left side 94L, but may have a fewer number of contact areas than left side 94L (e.g., may have two regions of contact instead of four). Based on this information, hand detection circuitry 50 may determine that a right hand is being used to hold and operate electronic device 10.

If desired, sensors 70 may be formed from one or more antennas in electronic device 10. Electronic device 10 may, for example, have multiple antennas so that optimal antenna performance can be maintained even when one antenna is not operating in optimal performance conditions. When the performance of one antenna is compromised (e.g., due to the presence of an external object such as a user's hand), the electronic device may switch to using a different antenna to transmit and receive radio frequency signals. Hand detection circuitry 50 may use antenna attenuation information and/or information about which antenna is being actively used to determine how electronic device 10 is being held by a user. For example, the use of one antenna may indicate that a certain portion of electronic device 10 is covered or not covered by a user's hand, which may in turn be indicative of whether a right or left hand is being used to operate electronic device 10. This is, however, merely illustrative. If desired, sensors 70 may be formed using proximity and/or touch sensing technologies such as capacitive touch sensor electrodes and/or light-based proximity sensor structures.

Figure 6A:
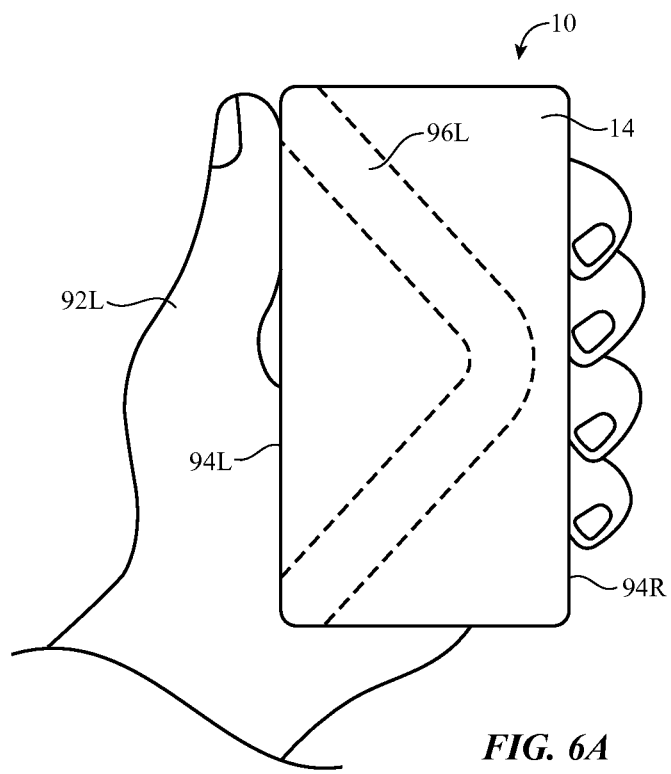
FIG. 6A is a diagram illustrating how a touch sensor in an electronic device can be used to detect when a user is operating the electronic device with his or her left hand in accordance with an embodiment of the present invention.
Figure 6B:
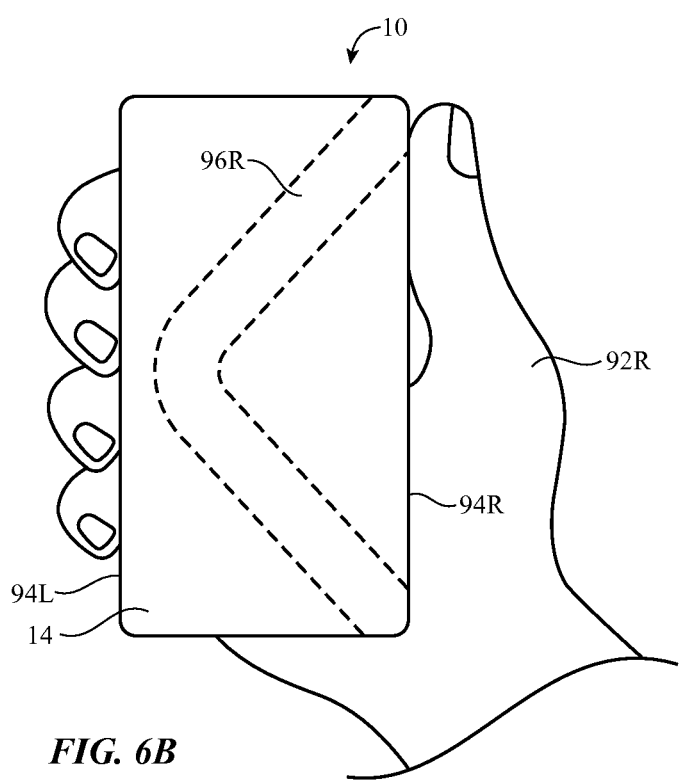
FIG. 6B is a diagram illustrating how a touch sensor in an electronic device can be used to detect when a user is operating the electronic device with his or her right hand in accordance with an embodiment of the present invention.

FIGS. 6A and 6B illustrate how a touch sensor in electronic device 10 can be used to gather information about which hand is being used to operate electronic device 10. When a user operates electronic device 10 using one hand, the user's thumb is often used as the primary finger with which the user provides touch input to touch screen display 14. With this type of grip, certain regions of display 14 may be easier to reach than others. This may in turn lead to certain patterns of contact with display 14.

For example, left hand 92L of FIG. 6A may tend to make more contact with the top left and bottom left corners (on left side 94L) of display 14 than the top right and bottom right corners (on right side 94R), simply because these regions may be easier to reach with the user's left thumb. In the central portion of display 14, the user's left thumb may tend to make more contact with the center portion on right side 94R of display 14 than the center portion on left side 94L of display 14. With repeated use, touch sensor 56 (FIG. 2) may detect a pattern of touches corresponding to the arc path followed by a user's left thumb such as arc path 96L. Based on the detected pattern 96L, hand detection circuitry 50 may determine that a left hand 92L is being used to operate electronic device 10.

Right hand 92R of FIG. 6B may tend to make more contact with the top right and bottom right corners (on right side 94R) of display 14 than the top left and bottom left corners (on left side 94L), simply because these regions may be easier to reach with the user's right thumb. In the central portion of display 14, the user's right thumb may tend to make more contact with the center portion on left side 94L of display 14 than the center portion on right side 94R of display 14. With repeated use, touch sensor 56 (FIG. 2) may detect a pattern of touches corresponding to the arc path followed by a user's right thumb such as arc path 96R. Based on the detected pattern 96R, hand detection circuitry 50 may determine that a right hand 92R is being used to operate electronic device 10.

Figure 7A:
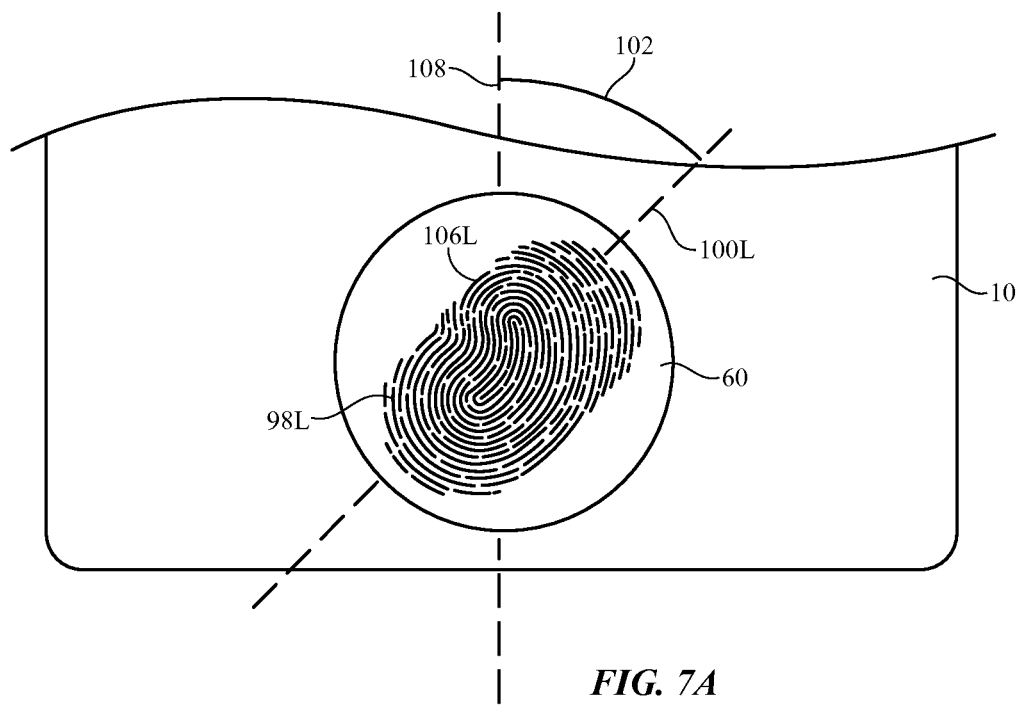
FIG. 7A is a diagram illustrating how a fingerprint sensor in an electronic device can detect when a user is operating the electronic device with his or her left hand in accordance with an embodiment of the present invention.
Figure 7B:
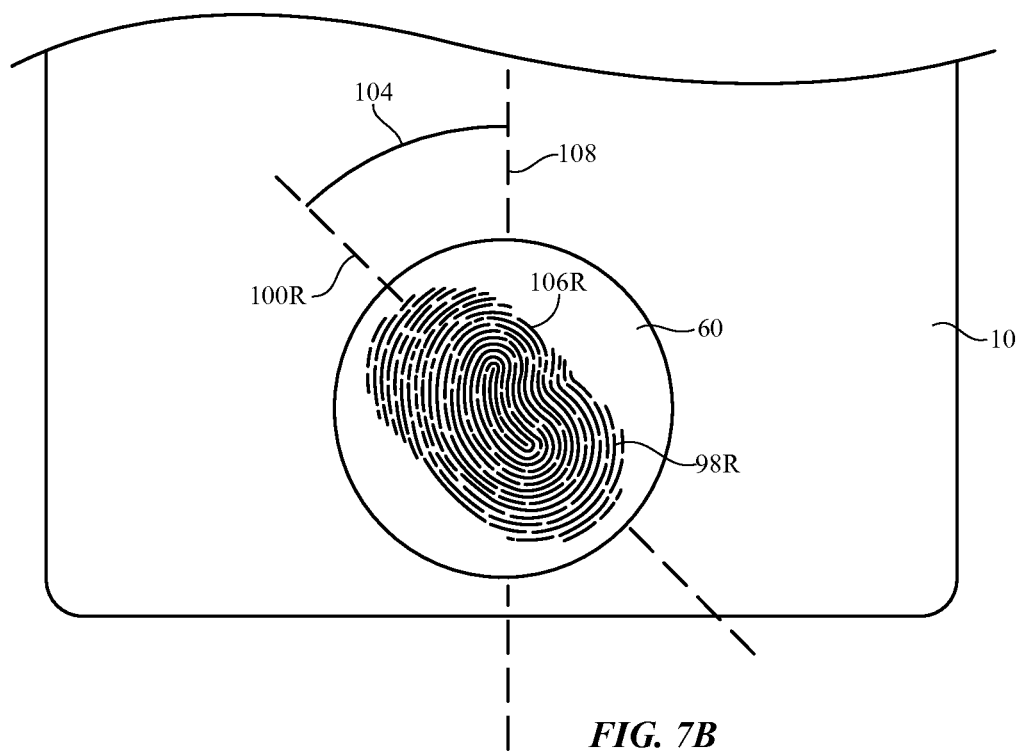
FIG. 7B is a diagram illustrating how a fingerprint sensor in an electronic device can detect when a user is operating the electronic device with his or her right hand in accordance with an embodiment of the present invention.

FIGS. 7A and 7B illustrate how a fingerprint sensor in electronic device 10 can be used to gather information about which hand is being used to operate electronic device 10. When a user operates electronic device 10 using one hand, the user will sometimes place his or her thumb on fingerprint sensor 60 (e.g., when pressing a button such as button 16 of FIG. 1 and/or during identity verification operations). Fingerprint information gathered by fingerprint sensor 60 may be indicative of which hand is being used to operate electronic device 10.

As shown in FIG. 7A, for example, longitudinal axis 100L of left thumbprint 98L will typically be rotated at a positive angle 102 with respect to center axis 108. In contrast, longitudinal axis 100R of right thumbprint 98R of FIG. 7B will typically be rotated at a negative angle with respect to center axis 108. Hand detection circuitry 50 may use information about the orientation of a user's thumbprint (e.g., the angle of the thumbprint relative to center axis 108) to determine which hand is being used to operate electronic device 10.

The orientation of the ridges in a thumbprint may also be indicative of which hand is being used. For example, ridges 106L of left thumbprint 98L may tend to arc one way, whereas ridges 106R of right thumbprint 98R may tend to arc another way. If desired, hand detection circuitry 50 may use ridge information from fingerprint sensor 60 to determine which hand is being used to operate electronic device 10.

Figure 8A:
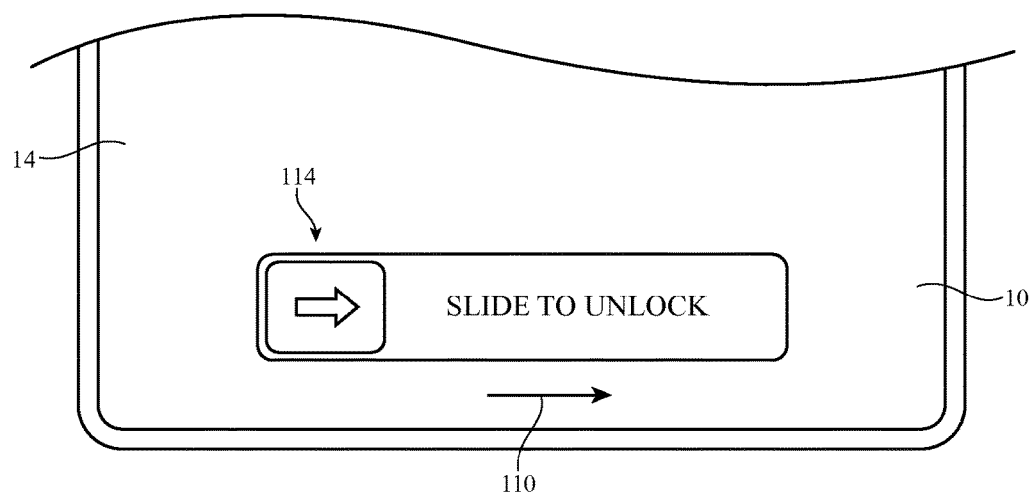
FIG. 8A is a diagram illustrating how user interface elements may be presented for a user operating the electronic device with his or her left hand in accordance with an embodiment of the present invention.
Figure 8B:
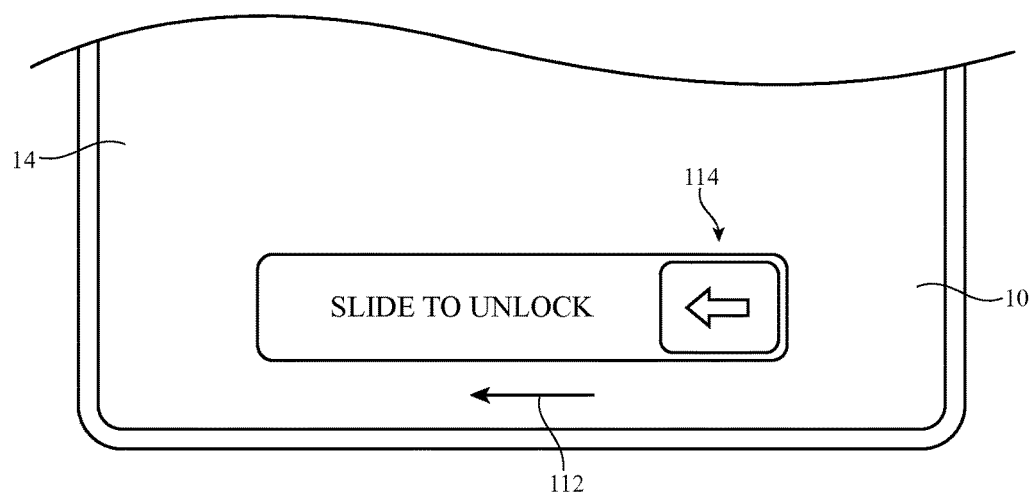
FIG. 8B is a diagram illustrating how user interface elements may be presented for a user operating the electronic device with his or her right hand in accordance with an embodiment of the present invention.

FIGS. 8A and 8B illustrate how user interface elements can be adjusted according to what hand is being used to operate electronic device 10. In the example of FIG. 8A, a user is prompted by display 14 to slide icon 114 in direction 110 to unlock the device and thereby enable certain functions and operations. In the example of FIG. 8B, a user is prompted by display 14 to slide icon 114 in direction 112 to unlock the device. Adjusting the direction of sliding according to which hand is being used may make it easier for a user to operate electronic device with one hand. For example, a user holding electronic device 10 in his or her left hand may find it easier to slide icon 114 in direction 110 than in direction 112. In contrast, a user holding electronic device 10 in his or her right hand may find it easier to slide icon 114 in direction 112 than in direction 114. Using hand detection circuitry 50 to determine which hand is being used to operate electronic device 10, control circuitry (e.g., control circuitry 40 of FIG. 2) may adjust the "slide to unlock" direction based on which hand is being used. If desired, the sliding direction may be based on user preferences and/or may be preset for a particular hand (e.g., direction 110 may be the sliding direction for left-handed users and direction 112 may be the sliding direction for right-handed users, or vice versa).

Figure 9A:
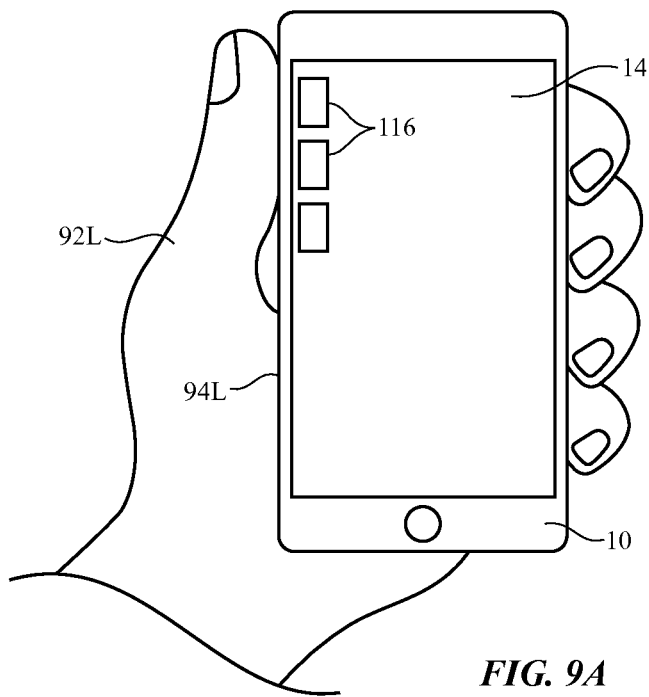
FIG. 9A is a diagram illustrating how virtual buttons can be positioned closer to the left edge of a display when the user is operating an electronic device with his or her left hand in accordance with an embodiment of the present invention.
Figure 9B:
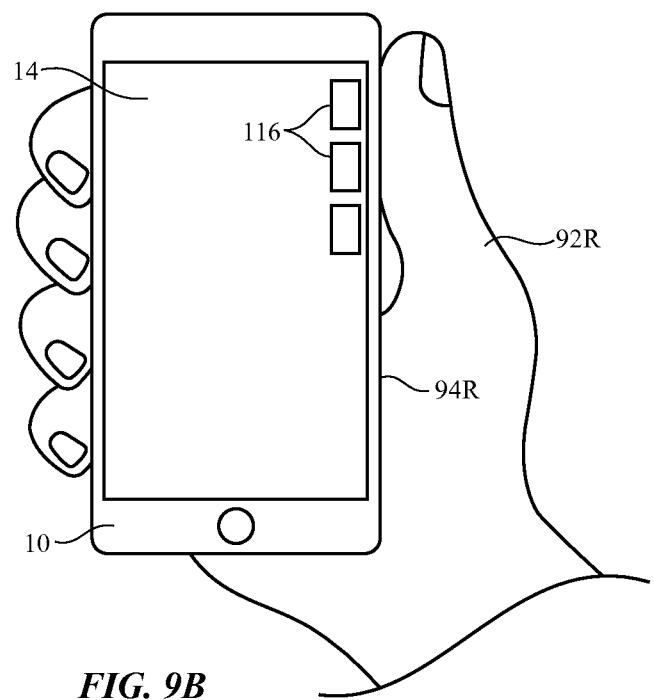
FIG. 9B is a diagram illustrating how virtual buttons can be positioned closer to the right edge of a display when the user is operating an electronic device with his or her right hand in accordance with an embodiment of the present invention.

FIGS. 9A and 9B show another illustrative way in which user interface elements can be adjusted according to which hand is being used to operate electronic device 10. In the example of FIG. 9A, hand detection circuitry 50 may determine that a user is operating electronic device 10 with his or her left hand 92L. In response to determining that left hand 92L is being used, control circuitry 40 may position virtual buttons such as virtual buttons or icons 116 closer to left side 94L of display 14. In the example of FIG. 9B, hand detection circuitry 50 may determine that a user is operating electronic device 10 with his or her right hand 92R. In response to determining that right hand 92R is being used, control circuitry 40 may position virtual buttons such as virtual buttons or icons 116 closer to right side 94R of display 14.

Icons 116 may, for example, form part of a keypad that is displayed during unlock operations when a user is prompted to enter a passcode, may form part of a keypad that is displayed during dialing operations when a user is dialing a telephone number, or may correspond to any other suitable display icon or virtual button. In one example, virtual buttons such as a "back" button in a browser application running on electronic device 10 may be located closer to left side 94L of display 14 when a user is operating electronic device 10 with his or her left hand, but may be closer to the right side 94R when a user is operating electronic device 10 with his or her right hand.

Figure 10:
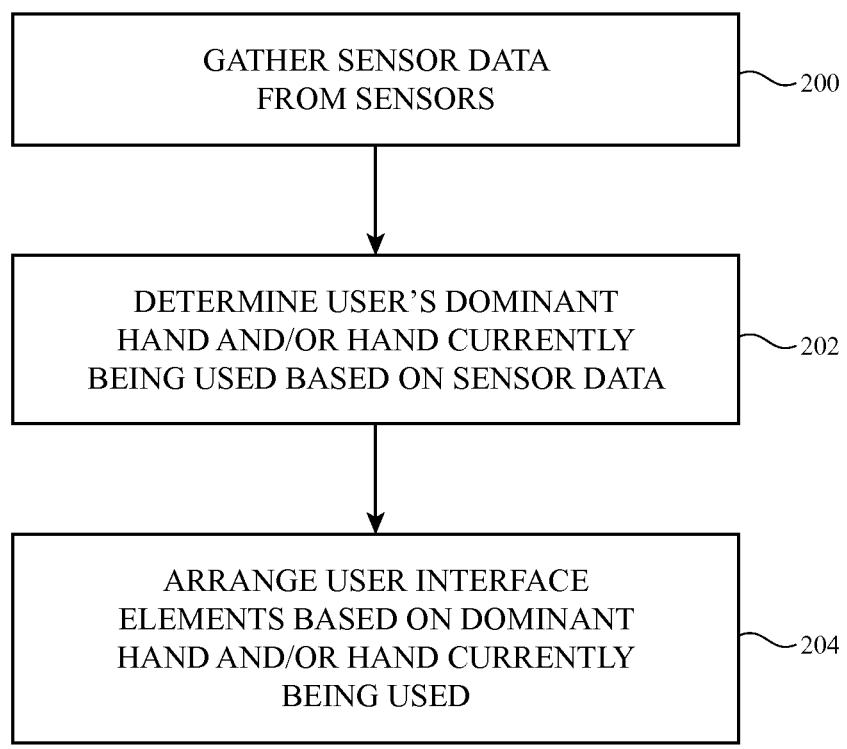
FIG. 10 is a flow chart of illustrative steps involved in operating an electronic device with hand detection circuitry in accordance with an embodiment of the present invention.

FIG. 10 is a flow chart of illustrative steps involved in operating an electronic device with hand detection circuitry such as hand detection circuitry 50 of FIG. 2.

At step 200, hand detection circuitry 50 may gather sensor data from one or more sensors in electronic device 10. This may include, for example, gathering motion sensor data from one or more motion sensors in electronic device 10 (e.g., from an accelerometer and/or gyroscope in electronic device 10), gathering touch or proximity data from sensors 70 along the side of electronic device 10, gathering antenna attenuation information from one or more antennas in electronic device 10, gathering arc path or touch pattern information from touch sensor 56 in electronic device 10, gathering fingerprint information from fingerprint sensor 60 in electronic device 10, and/or gathering information from other electronic components in electronic device 10.

At step 202, hand detection circuitry 50 may determine which hand is being used to operate electronic device 10 based on the sensor data gathered in step 200. For example, motion sensor data may be used to determine how electronic device 10 is moved by a user and thereby determine which hand is being used to operate electronic device 10; touch and/or proximity data from side sensors 70 may be used to determine which side of electronic device 10 is more covered and/or to determine which side has a greater number of points of contact, which in turn can be used to determine which hand is being used to operate electronic device 10; antenna attenuation information can be used to determine whether an antenna signal is attenuated as a result of a user's hand being present in a particular location on electronic device 10, which in turn can be used to determine which hand is being used to operate electronic device 10; touch input patterns from touch sensor 56 can be used to determine the arc path of a user's thumb, which in turn can be indicative of what hand is being used to operate electronic device 10; and thumbprint information can be used to determine the angle at which a thumbprint is oriented and/or the orientation of ridges within the thumbprint, which in turn can be indicative of what hand is being used to operate device 10.

At step 204, control circuitry (e.g., control circuitry 40 of FIG. 2) may take appropriate action based on which hand is being used to operate electronic device 10. For example, user interface elements such as icons 114 of FIGS. 8A and 8B and icons 116 of FIGS. 9A and 9B may be positioned such that one-handed operation is made easier. This may include positioning icons closer to a left side of the display when a user's left hand is being used to operate electronic device 10 and positioning icons closer to a right side of the display when a user's right hand is being used to operate electronic device 10.

The use of sensors to determine the handedness of a user is merely illustrative. If desired, control circuitry may adjust user interface elements according to user preferences. For example, a user may select whether he or she would like to have user interface elements optimized for right-handed use or for left-handed use.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   at least one sensor that gathers sensor data;
   control circuitry that determines whether the electronic device is being operated by a left hand or a right hand of a user based on the sensor data; and
   a touch-sensitive display that displays a virtual button, wherein the control circuitry positions the virtual button on the touch-sensitive display based on whether the electronic device is being operated by the left hand or the right hand of the user, wherein the at least one sensor comprises a fingerprint sensor that determines an angle of a fingerprint on the fingerprint sensor relative to an axis, and wherein the control circuitry determines whether the electronic device is being operated by a left hand or a right hand based on the angle of the fingerprint.

2. The electronic device defined in claim 1 wherein the at least one sensor comprises a motion sensor.

3. The electronic device defined in claim 1 wherein the at least one sensor comprises a touch sensor.

4. The electronic device defined in claim 3 wherein the touch sensor comprises an array of capacitive touch sensor electrodes that forms part of the touch-sensitive display.

5. The electronic device defined in claim 1 wherein the electronic device has first and second opposing sides and wherein the at least one sensor comprises a first touch sensor on the first side and a second touch sensor on the second side.

6. The electronic device defined in claim 5 wherein the first and second touch sensors comprise first and second capacitive touch sensors on opposing sides of the touch-sensitive display.

7. The electronic device defined in claim 1 wherein the electronic device has first and second opposing sides and wherein the at least one sensor comprises a first proximity sensor on the first side and a second proximity sensor on the second side.

8. The electronic device defined in claim 7 wherein the first and second proximity sensors comprise first and second light-based proximity sensors.

9. A method for operating an electronic device, comprising:
    with at least one sensor in the electronic device, gathering sensor data;
    with control circuitry in the electronic device, determining whether the electronic device is being operated by a right hand or a left hand of a user based on the sensor data; and
    with the control circuitry, positioning a virtual button on a touch-sensitive display based on whether the electronic device is being operated by the right hand or the left hand of the user, wherein the at least one sensor comprises a motion sensor, wherein gathering the sensor data comprises detecting a rotation of the electronic device, and wherein determining whether the electronic device is being operated by the right hand or the left hand of the user comprises determining whether the rotation is a clockwise rotation or a counterclockwise rotation.

10. The method defined in claim 9 wherein the at least one sensor comprises a touch sensor that gathers touch input from a user and wherein gathering the sensor data comprises detecting a pattern in the touch input.

11. The method defined in claim 9 wherein the at least one sensor comprises a fingerprint sensor and wherein gathering the sensor data comprises gathering fingerprint information.

12. The method defined in claim 11 wherein determining whether the electronic device is being operated by the right hand or the left hand of the user comprises determining an orientation of a thumbprint.

13. The method defined in claim 9 wherein the electronic device comprises first and second opposing sides, wherein the at least one sensor comprises a first sensor on the first side and a second sensor on the second side, and wherein determining whether the electronic device is being operated by the right hand or the left hand of the user comprises comparing information from the first sensor and the second sensor.

14. A method for operating a portable electronic device having first and second opposing sides and having a touch-sensitive display, comprising:
    with at least one light-based proximity sensor, gathering sensor data;
    with control circuitry, comparing a first surface area covered on the first side of the electronic device with a second surface area covered on the second side of the electronic device based on the sensor data;
    determining whether the touch-sensitive display is being operated by a left hand or a right hand based on the sensor data; and
    arranging icons on the touch-sensitive display based on whether the electronic device is being operated by the left hand or the right hand.

15. The method defined in claim 14 wherein the touch-sensitive display has first and second opposing edges, the method further comprising:
    in response to determining that the touch-sensitive display is being operated by the left hand, arranging the icons along the first edge of the touch-sensitive display.

16. The method defined in claim 15 further comprising:
    in response to determining that the touch-sensitive display is being operated by the right hand, arranging the icons along the right edge of the touch-sensitive display.

17. The method defined in claim 14 wherein the at least one light-based proximity sensor comprises a first light-based proximity sensor on a first edge of the portable electronic device and a second light-based proximity sensor on an opposing second edge of the portable electronic device.

* * * * *